UNITED STATES PATENT OFFICE.

CHARLES JULES HENRI NICOLLE, OF TUNIS, TUNIS.

VACCIN CULTURE AND THE LIKE AND THE PREPARATION THEREOF.

1,202,567.  Specification of Letters Patent.  Patented Oct. 24, 1916.

No Drawing.  Application filed December 13, 1913.  Serial No. 306,589.

*To all whom it may concern:*

Be it known that I, CHARLES JULES HENRI NICOLLE, citizen of the Republic of France, residing at Institut Pasteur de Tunis, Tunis, Tunis, have invented certain new and useful Improvements in and Relating to Vaccin Cultures and the like and the Preparation Thereof, of which the following is a specification.

In order to obtain a vaccin (*e. g.* for preventive and therapeutic purposes) of the maximum immunizing power from bacterial cultures or from killed virus, it is essential to destroy the vitality of the bacillus without violently coagulating its protoplasm and preventing all subsequent autolysis.

To this end, according to the invention we stabilize the vaccin by a fluorin compound. Example: The virus or bacterial culture is emulsified in a solution of sodium fluorid (0.7 per cent., though this strength is only given by way of example). The emulsion is carefully centrifuged. The deposited matter is washed and then suspended in the same fluorid solution. The bacterial mass is separated by centrifuging at a suitable speed and the fine emulsion of bacteria so isolated is separated, and when brought to the optimum bacterial titration this yields the stabilized vaccin.

The sodium fluorid may be replaced by other soluble fluorids, double salts of fluorin or fluosels.

At the moment of using the vaccin the stabilizing agent may be rendered insoluble by a suitable salt, if desired.

It is of course to be understood in construing my claims that vaccins are distinguished from sera by the fact that vaccins contain bacteria.

I declare that what I claim is:—

1. A process for producing vaccins, comprising forming a bacterial culture, treating the same with a fluorid compound, centrifuging the emulsion, washing out the deposited matter, suspending the same in the same fluorid solution, then separating the bacterial mass by centrifuging at a suitable speed and then separating the fine emulsion of bacteria and bringing the same to the optimum bacterial titration for producing stabilized vaccin.

2. A process for producing vaccins, comprising forming a bacterial culture and stabilizing the same by treatment with a soluble fluorid compound to prevent autolysis.

3. A process for producing vaccins, comprising forming a bacterial culture and treating the same with a solution containing sodium fluorid.

4. A process for producing vaccins, comprising forming a bacterial culture and treating the same with a solution containing sodium fluorid, and rendering the stabilizing agent insoluble when the vaccin is to be used.

5. A new product consisting of a bacterial culture treated with a soluble fluorin compound.

In witness whereof I have hereunto set my name this 21st day of November, 1913, in the presence of two subscribing witnesses.

CHARLES JULES HENRI NICOLLE.

Witnesses:
 ANTONIN MONTEILHET,
 HANSON C. COXE.